United States Patent
Moon et al.

(10) Patent No.: US 10,236,581 B2
(45) Date of Patent: Mar. 19, 2019

(54) NEAR FIELD COMMUNICATION ANTENNA

(71) Applicant: SAMSUNG ELECTRONICS CO., LTD., Suwon-si (KR)

(72) Inventors: Byeongtaek Moon, Seoul (KR); Youngki Lee, Incheon (KR); Yohan Jang, Seoul (KR); Hyounghwan Roh, Seoul (KR); Iljong Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 14/805,984

(22) Filed: Jul. 22, 2015

(65) Prior Publication Data
US 2016/0028159 A1 Jan. 28, 2016

(30) Foreign Application Priority Data

Jul. 22, 2014 (KR) .................. 10-2014-0092780

(51) Int. Cl.
*H01Q 7/00* (2006.01)
*H04B 5/00* (2006.01)

(52) U.S. Cl.
CPC ............ *H01Q 7/00* (2013.01); *H04B 5/0075* (2013.01)

(58) Field of Classification Search
CPC .. H01Q 1/2208; H01Q 1/2225; H01Q 1/2216; H01Q 7/00; H01Q 9/27; H01Q 7/005
See application file for complete search history.

(56) References Cited

U.S. PATENT DOCUMENTS

| | | | |
|---|---|---|---|
| 7,880,549 B1 | 2/2011 | Tserng et al. | |
| 7,952,526 B2 | 5/2011 | Lee et al. | |
| 8,104,358 B1 | 1/2012 | Jia et al. | |
| 8,508,429 B2 | 8/2013 | Nishioka et al. | |
| 8,576,124 B2 | 11/2013 | Popugaev et al. | |
| 8,659,495 B2 | 2/2014 | Yanagi et al. | |
| 8,686,920 B2 | 4/2014 | Sarabandi et al. | |
| 8,736,495 B2* | 5/2014 | Cho .................. | G06K 19/0723 343/702 |
| 2007/0030207 A1* | 2/2007 | Ibi ........................... | H01Q 1/22 343/742 |

(Continued)

FOREIGN PATENT DOCUMENTS

KR 10-1054989 B1 8/2011
KR 10-2014-0072643 A 6/2014

*Primary Examiner* — Hoang V Nguyen
*Assistant Examiner* — Awat M Salih
(74) *Attorney, Agent, or Firm* — Sughrue Mion, PLLC

(57) ABSTRACT

An antenna of a near field wireless communication device is provided. The antenna may include: a source coil pattern formed on one surface of a flexible printed circuit board (FPCB) and formed with a first conductive line between a first antenna port and a second antenna port; a resonance coil pattern formed with a second conductive line, which electrically separates from the source coil pattern; and a capacitor pattern electrically connected to the second conductive line, wherein one terminal of the capacitor pattern is connected to a first terminal of the second conductive line and the other terminal of the capacitor pattern is connected to a second terminal of the second conductive line through a third conductive line formed on the other surface of the FPCB.

14 Claims, 12 Drawing Sheets

(56) References Cited

U.S. PATENT DOCUMENTS

| | | |
|---|---|---|
| 2008/0204327 A1 | 8/2008 | Lee et al. |
| 2008/0246664 A1* | 10/2008 | Ikemoto ............ G06K 19/07749 343/700 MS |
| 2010/0019908 A1 | 1/2010 | Cho et al. |
| 2011/0025471 A1 | 2/2011 | Popugaev et al. |
| 2011/0084888 A1 | 4/2011 | Nishioka et al. |
| 2011/0128071 A1 | 6/2011 | Fukusen et al. |
| 2011/0175790 A1 | 7/2011 | Yanagi et al. |
| 2011/0267194 A1 | 11/2011 | Hong et al. |
| 2012/0190296 A1 | 7/2012 | Sarabandi et al. |
| 2012/0223869 A1 | 9/2012 | Kim et al. |
| 2013/0281018 A1 | 10/2013 | Wilson |
| 2014/0062666 A1* | 3/2014 | Patterson ............ G06K 19/0716 340/10.1 |
| 2014/0145906 A1* | 5/2014 | Kato ........................ H01Q 7/00 343/867 |
| 2014/0154980 A1 | 6/2014 | Jang et al. |
| 2014/0292610 A1* | 10/2014 | Iwahashi .................. H01Q 7/00 343/867 |
| 2014/0375524 A1* | 12/2014 | Nago ....................... H01Q 7/00 343/866 |

\* cited by examiner

NEAR FIELD COMMUNICATION ANTENNA

CROSS-REFERENCE TO RELATED APPLICATIONS

This application claims priority from Korean Patent Application No. 10-2014-0092780 filed Jul. 22, 2014, in the Korean Intellectual Property Office, the entire disclosure of which is incorporated herein by reference.

BACKGROUND

Apparatuses and methods consistent with exemplary embodiments relate to a wireless communication device, and more particularly, to a double loop resonance antenna of a near field communication device.

Near field communication (NFC) is a contactless near field communication technique using a frequency bandwidth of 13.56 MHz. Generally, portable stations in which an NFC chip is installed communicate with an external station or a card using an NFC antenna.

A fundamental NFC antenna has a loop antenna structure. The NFC antenna with a loop antenna connects a chip capacitor to a single loop antenna to generate LC resonance. The antenna may use a double resonance loop to raise magnetic field of the fundamental NFC antenna. The double resonance loop has an antenna structure in which two resonance loops are used to raise magnetic field. Four ports and two chip capacitors are needed to compose the double resonance loop.

The problems with this structure may include the following: difficulty in making mobile stations including the NFC antenna light, thin, short, and small, an additional external space, and an increase in a cost.

However, as mobile devices are widely used, requirement for an NFC antenna capable of guaranteeing a high quality factor at a low cost increases.

SUMMARY

According to an aspect of an exemplary embodiment, there is provided an antenna of a near field wireless communication device, the antenna comprising: a source coil pattern formed on one surface of a flexible printed circuit board (FPCB) and formed with a first conductive line between a first antenna port and a second antenna port; a resonance coil pattern formed with a second conductive line, which electrically separates from the source coil pattern; and a capacitor pattern electrically connected to the second conductive line, wherein one terminal of the capacitor pattern is connected to a first terminal of the second conductive line and the other terminal of the capacitor pattern is connected to a second terminal of the second conductive line through a third conductive line formed on the other surface of the FPCB.

According to an aspect of another exemplary embodiment, there is provided a double resonance loop antenna of a near field wireless communication device, the double resonance loop antenna comprising: a source loop configured to include a first capacitor and a first coil connected to two antenna ports in parallel; and a resonance loop electrically separated from the source loop and configured to include a second capacitor and a second coil, wherein the second capacitor is formed with a pattern of a conductive line for forming the second coil.

According to an aspect of another exemplary embodiment, there is provided a double resonance loop antenna of a near field wireless communication device, the double resonance loop antenna comprising: a flexible printed circuit board (FPCB); a first coil formed on one surface of the FPCB; a second coil formed on the one surface of the FPCB and electrically separated from the first coil; and a resonance capacitor connected to two terminals of the second coil and formed with a pattern of a conductive line formed on the FPCB.

According to an aspect of another exemplary embodiment, there is provided a near field communication (NFC) device comprising an NFC antenna, the NFC device comprising: an NFC chip configured to include an NFC transceiver for communicating with an external device; and a double resonance loop antenna, which is connected to the NFC chip through two antenna ports, comprising a source loop and a resonance loop electrically separated from the source loop, wherein the source loop comprises a first capacitor and a first coil, and the resonance loop comprises a second capacitor and a second coil, and wherein the second capacitor is formed with a pattern of a conductive line for forming the second coil.

According to the inventive concept, a capacitor for composing a resonance loop may be formed with a pattern of a conductive line. Accordingly, the inventive concept may provide a double resonance loop antenna for reducing a product cost and having a high quality factor compared with using a chip capacitor.

BRIEF DESCRIPTION OF THE DRAWINGS

The above and/or other aspects will become apparent from the following description with reference to the following drawings, in which.

DETAILED DESCRIPTION OF THE EXEMPLARY EMBODIMENTS

Figure 1:
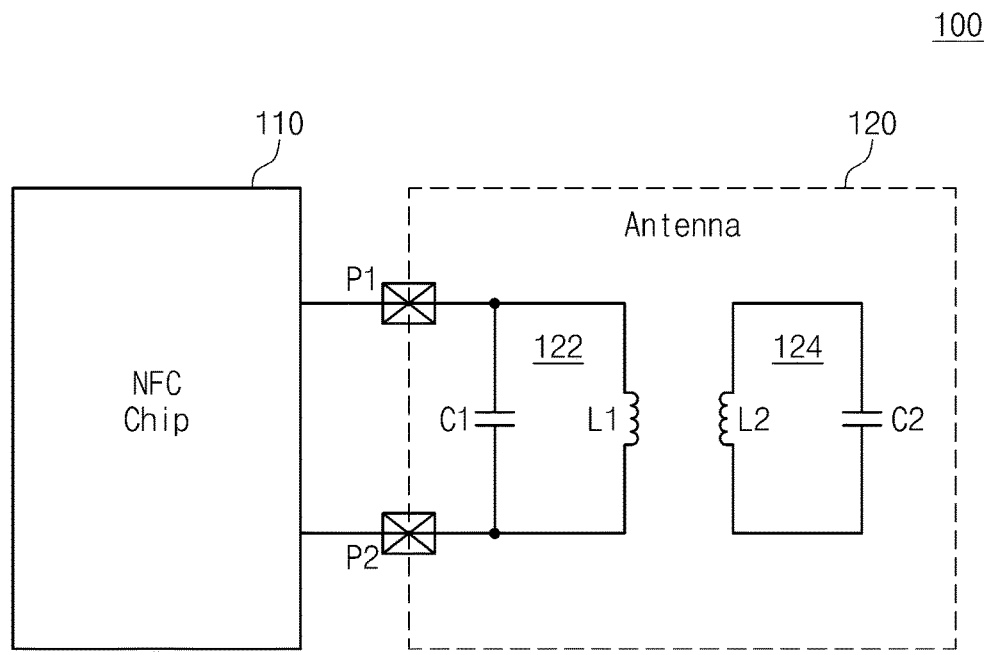
FIG. 1 is a diagram illustrating a near field communication (NFC) device including an NFC antenna according to an exemplary embodiment.

Exemplary embodiments will be described in detail with reference to the accompanying drawings. The exemplary embodiments, however, may be embodied in various different forms, and should not be construed as being limited only to the exemplary embodiments. Rather, the described exemplary embodiments are provided as examples so that this disclosure will be thorough and complete, and will fully convey the scope of the exemplary embodiments to those of ordinary skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. In other words, the device may be otherwise reoriented (e.g., rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular exemplary embodiments only and is not intended to be limiting of the exemplary embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram illustrating a near field communication (NFC) device including an NFC antenna according to an exemplary embodiment. Referring to FIG. 1, an NFC device 100 according to an exemplary embodiment includes an NFC chip 110 and an antenna 120.

The NFC chip 110 stores and processes various information such as user information and payment information. The NFC chip 110 may include an NFC transceiver for communicating with an external device such as an NFC reader. A transmission signal generated by the NFC transceiver is transmitted via the antenna 120. An NFC reception signal received via the antenna 120 may be processed through a demodulation circuit of the NFC chip 110.

The antenna 120 is connected to the NFC chip 110 through two antenna ports P1 and P2. The antenna 120 transmits a transmission signal transmitted from the NFC chip 110 as an electromagnetic wave. The antenna 120 may have a loop antenna structure to communicate with an external station or a card. Especially, the antenna 120 may have a double resonance loop structure for high electromagnetic efficiency. That is, the antenna 120 may include a source loop 122 and a resonance loop 124, which are electrically separated.

The source loop 122 includes a first capacitor C1 connected to two antenna ports P1 and P2 in parallel, and a first inductor L1. The first capacitor C1 may be implemented with a capacitor element (e.g., a chip capacitor.) connected between the two antenna ports P1 and P2, and the first inductor L1 may be formed through a conductive pattern of a coil type. In addition, the first capacitor C1 may be implemented with a pattern of a conductive line formed on a flexible printed circuit board (FPCB) in which a pattern of the antenna 120 is formed.

The resonance loop 124 is electrically separated from the source loop 122. That is, energy is charged or discharged in or from a second capacitor C2 and a second inductor L2 in the resonance loop 124 by magnetic induction from the source loop 122. When current supplied from the NFC chip 110 flows to the source loop 122, magnetic field may be induced around a coil to compose the source loop 122. Here, magnetic field formed from the source loop 122 may make an induced current flow in a coil of the resonance loop 124. In other words, the resonance loop 124 receives power from the source loop 122 by magnetic induction. The first inductor L1 and the first capacitor C1 of the source loop 122 may be determined to resonate at central frequency (e.g., 13.56 MHz) by a signal outputted from the NFC chip 110. Moreover, magnetic field generated from the antenna 120 may be increased by magnetic field of the source loop 122 and magnetic field of the resonance loop 124.

The second inductor L2 in the resonance loop 124 may be implemented with a coil pattern of a conductive line formed on a surface of the FPCB, and the second capacitor C2 may be implemented with a pattern of a conductive line which is formed on the FPCB. In this case, a double resonance loop antenna with a high quality factor Q may be implemented without an additional via for installing a chip capacitor and an additional port for connecting the chip capacitor. The second capacitor C2 for composing the resonance loop 124 may be formed with various patterns which may be formed on an upper surface or a lower surface of the FPCB to provide a required quality factor Q.

Figure 2:
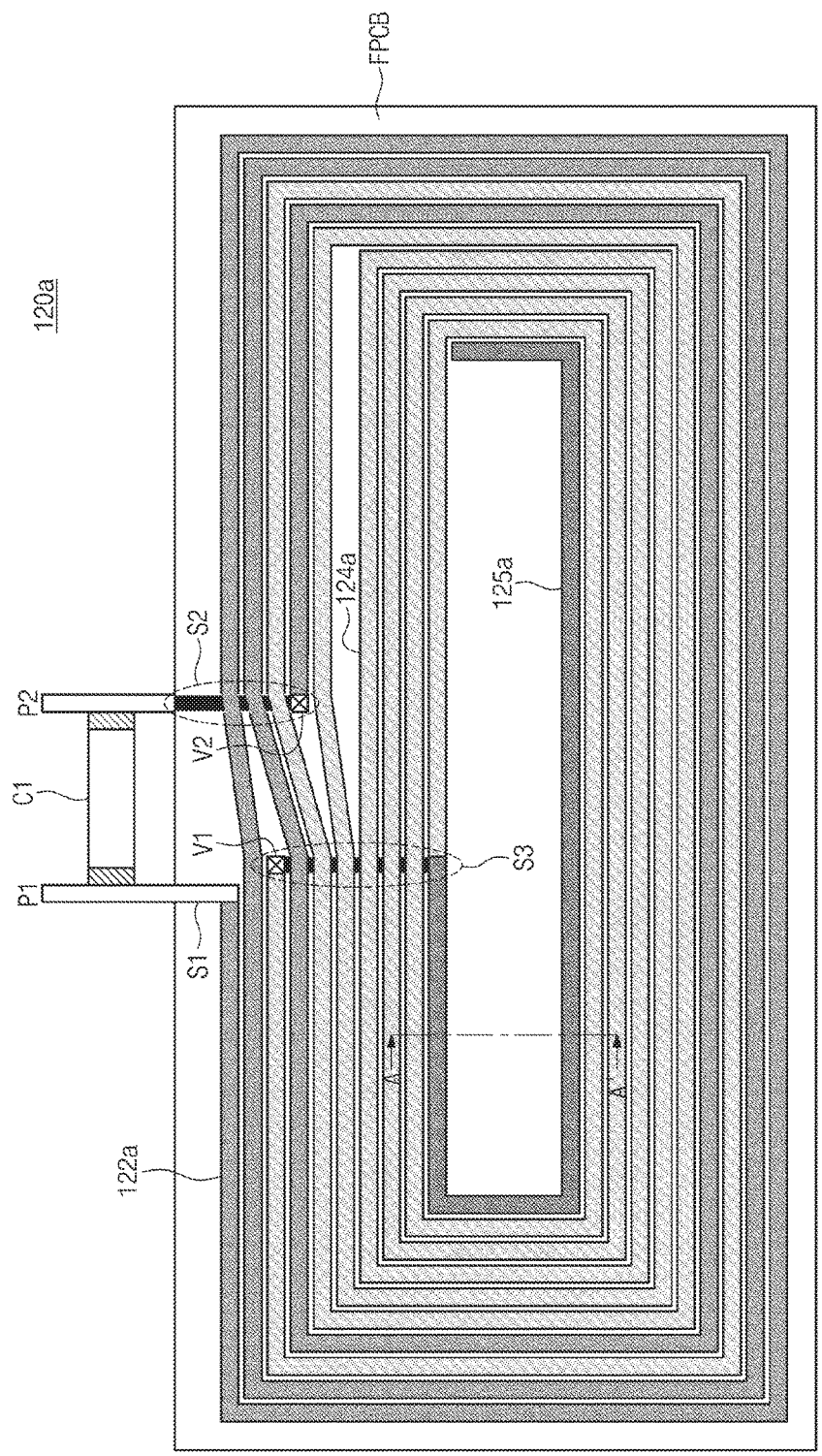
FIG. 2 is a floor plan illustrating an upper surface of a double resonance loop antenna according to a first exemplary embodiment.

FIG. 2 is a floor plan illustrating an upper surface of a double resonance loop antenna according to a first exemplary embodiment. Referring to FIG. 2, a double resonance loop antenna 120a may include a first capacitor C1 for composing a source loop 122 between two antenna ports P1 and P2, a source coil pattern 122a formed on an upper surface of a FPCB, a resonance coil pattern 124a for composing a resonance loop 124, and a capacitor pattern 125a for composing a second capacitor C2. The capacitor pattern 125a for composing the second capacitor C2 may be formed with a metal-insulator-metal (MIM) capacitor, and an additional capacitor pattern 125b (refer to FIG. 3) which is formed in parallel with the capacitor pattern 125a may exist on a lower surface of the FPCB.

The source coil pattern 122a is formed on the upper surface of the double resonance loop antenna 120a. The source coil pattern 122a may be formed on the upper surface of the FPCB with a conductive line such as a metal strap. A loop for composing the source coil pattern 122a starts from a first port P1, rotates with a plurality of turns and terminates at a via V2 for connecting a second port P2. A terminal of the source coil pattern 122a is connected to a conductive line S2 formed on the lower surface of the FPCB by the via V2. The source coil pattern 122a is connected to the second port P2 by the conductive line S2.

Therefore, the source coil pattern 122a for composing the source loop and the two ports P1 and P2 are electrically connected. Furthermore, the first capacitor C1 formed between the two antenna ports P1 and P2 and the first inductor L1 formed with the source coil pattern 122a are connected in parallel. Here, a magnitude of the first inductor L1 that is expressed by a distribution circuit constant may be determined according to the number of turns of a loop for composing the source coil pattern 122a.

The resonance coil pattern 124a and the capacitor pattern 125a are formed on the upper surface of the double resonance loop antenna 120a. The resonance coil pattern 124a may be formed with a conductive line to rotate with a plurality of turns to form a second inductor L2 for composing the resonance loop 124 shown in FIG. 1. The resonance coil pattern 124a starts from a via V1 for connecting a pattern on a lower surface of the double resonance loop antenna 120a. Moreover, the resonance coil pattern 124a forms a plurality of helical coil turns and is formed on an upper surface of the FPCB. A conductive line for forming the source coil pattern 122a may be formed among conductive lines for composing the resonance coil pattern 124a. However, the source coil pattern 122a and the resonance coil pattern 124a may be electrically separated.

An inside terminal of the resonance coil pattern 124a may be connected to the capacitor pattern 125a. The capacitor pattern 125a may be formed by extending a conductive line for composing the resonance coil pattern 124a. The capacitor pattern 125a may be formed with a conductive line having the same line width and thickness as the resonance coil pattern 124a. Magnitude of the second capacitor C2 for composing a resonance loop may be determined according to the number of turns or length of the resonance coil pattern 124a. Further, an inductance L2 of a resonance loop may be determined according to the number of turns of a loop for forming the resonance coil pattern 124a. Accordingly, the resonance coil pattern 124a and the capacitor pattern 125a may be formed with the number of turns and length of a loop for providing magnitude of LC for generating an optimal resonant frequency.

Especially, the capacitor pattern 125a may be formed with a metal-insulator-metal (MIM) capacitor. That is, the second capacitor C2 of a resonance loop may be implemented with the capacitor pattern 125a formed on the upper surface of the FPCB and the capacitor pattern 125b (refer to FIG. 3) on the lower surface of the FPCB by using the FPCB as a dielectric film. In FIG. 2, a conductive line of the capacitor pattern 125a and a conductive line of the resonance coil pattern 124a are displayed with a different color to distinguish a conductive line of the capacitor pattern 125a and a conductive line of the resonance coil pattern 124a. However, these conductive lines may be formed with the same material and to have a successive form. While a same type of the capacitor pattern 125b is formed on a lower surface of the capacitor pattern 125a, a conductive line does not exist on a lower surface of the resonance coil pattern 124a. This structure may be described in a cross-sectional diagram of FIG. 4 in detail.

When the capacitor pattern 125a is formed with a type of the MIM capacitor, a line width or a length of the capacitor pattern 125a and an interval between a pattern of an upper surface and a pattern of a lower surface may be adjusted to increase a quality factor Q. Further, the capacitor pattern 125a may be formed to synchronize a direction of current to flow through the capacitor pattern 125a with a direction of current to flow through the resonance coil pattern 124a. Moreover, the capacitor pattern 125a may be formed with a pattern for minimizing a usage count of a via to increase a quality factor Q.

Figure 3:
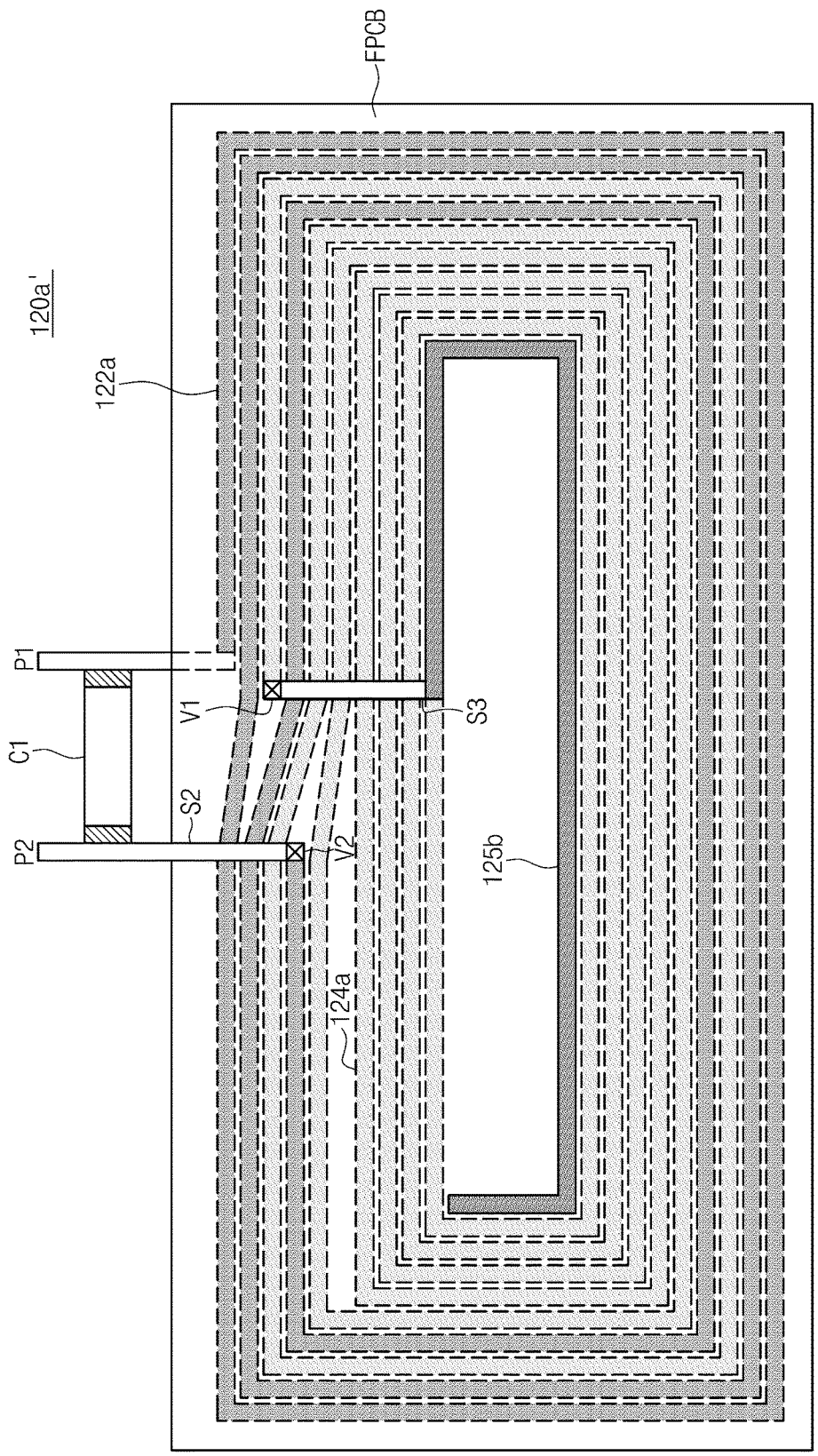
FIG. 3 is a floor plan illustrating a lower surface of a double resonance loop antenna shown in FIG. 2.

FIG. 3 is a floor plan illustrating a lower surface of a double resonance loop antenna shown in FIG. 2. Referring to FIG. 3, a conductive line S2 connected to a via V2 for pulling out a port P2 and a capacitor pattern 125b are formed on a lower surface of a double resonance loop antenna 120a'. Here, conductive lines displayed with a dotted line denote patterns formed on an upper surface of the FPCB.

The capacitor pattern 125b is formed on the lower surface of the double resonance loop antenna 120a'. The capacitor pattern 125b may be symmetrical with respect to the FPCB with a capacitor pattern 125a formed on the upper surface. The second capacitor C2 is formed with the capacitor pattern 125b on the lower surface and the capacitor pattern 125a on the upper surface. The capacitor pattern 125b on the lower surface is connected to a conductive line S3. The conductive line S3 is connected to one terminal of a resonance coil pattern 124a on the upper surface through the via V1. That is, one terminal of the resonance coil pattern 124a formed on the upper surface is electrically connected to the capacitor pattern 125b on the lower surface through the via V1. Moreover, the other terminal of the resonance coil pattern 124a formed on the upper surface is electrically connected to the capacitor pattern 125a on the upper surface. The FPCB operates as a dielectric substance between the capacitor patterns 125a and 125b to form the second capacitor C2. Here, shapes of the capacitor patterns 125a and 125b are identical to each other. However, the inventive concept is not limited thereto. For example, the capacitor patterns 125a and 125b may be formed to have different shapes.

The capacitor pattern 125b and the conductive line S2 are formed on the lower surface of the double resonance loop antenna 120a'. The conductive line S2 is connected to a terminal of a source coil pattern 122a formed on the upper surface through the via V2. The conductive line S2 may be connected to the port P2 of the double resonance loop antenna 120a'

While the number of turns of the capacitor pattern 125b is displayed to be smaller than 1, the inventive concept is not limited thereto. That is, to obtain a resonance capacitance having sufficient magnitude, lengths of the capacitor patterns 125a and 125b may be diversely adjusted. Moreover, a line width of a conductive line for composing the capacitor patterns 125a and 125b may be formed to be larger or smaller than a line width of the resonance coil pattern 124a.

Figure 4:
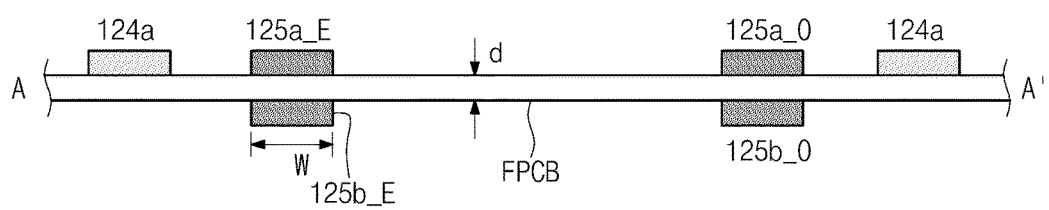
FIG. 4 is a cross-sectional view taken along line A-A' shown in FIG. 2.

FIG. 4 is a cross-sectional view taken along a line A-A' shown in FIG. 2. Referring to FIG. 4, capacitor patterns 125a and 125b may be formed with conductive lines of an upper surface and a lower surface, respectively. For example, conductive lines may be provided in the form of a metal strap.

Capacitor patterns 125a_E and 125a_O which are successive to a conductive line of a resonance coil pattern 124a are formed on an upper surface of the FPCB. That is, capacitor patterns 125a_E and 125a_O which are successive to a terminal of the resonance coil pattern 124a are formed on the upper surface of the FPCB. Moreover, capacitor patterns 125b_E and 125b_O are formed on a lower surface of one end of the resonance coil pattern 124a from which the capacitor patterns 125a_E and 125a_O start.

The capacitor patterns 125a_E and 125a_O formed on the upper surface of the FPCB may be formed with a conductive line of the same type as the resonance coil pattern 124a. However, a type or a line width of the capacitor patterns 125a_E and 125a_O or an interval among conductive lines may be changed according to various purposes. The capacitor patterns 125a_E and 125a_O are electrically connected. However, the capacitor patterns 125a_E and 125a_O may be spaced apart from each other. Moreover, the capacitor patterns 125a_E and 125a_O on the upper surface and the capacitor patterns 125b_E and 125b_O on the lower surface are formed such that the number of turns is one or less than one. However, each of the capacitor patterns 125a_E, 125a_O, 125b_E, and 125b_O may be formed to have a coil type with at least two turns, thereby making it possible to provide an optimized characteristic of the resonance loop 124.

Moreover, the capacitor patterns 125b_E and 125b_O formed on the lower surface of the FPCB may be symmetrical with the capacitor patterns 125a_E and 125a_O formed on the upper surface of the FPCB. Further, an interval (d) between the capacitor patterns 125a_E and 125a_O on the upper surface and the capacitor patterns 125b_E and 125b_O on the lower surface may act as a dielectric in the FPCB. A line width of each of the capacitor patterns 125a_E and 125a_O on the upper surface and the capacitor patterns 125b_E and 125b_O on the lower surface may be substantially the same as a line width of the resonance coil pattern 124a. However, a line width of the capacitor patterns 125a_E and 125a_O on the upper surface and the capacitor patterns 125b_E and 125b_O on the lower surface may be different from a line width of the resonance coil pattern 124a. Moreover, a line width of the capacitor patterns 125a_E and 125a_O on the upper surface and a line width of the capacitor patterns 125b_E and 125b_O on the lower surface may be different.

Figure 5:
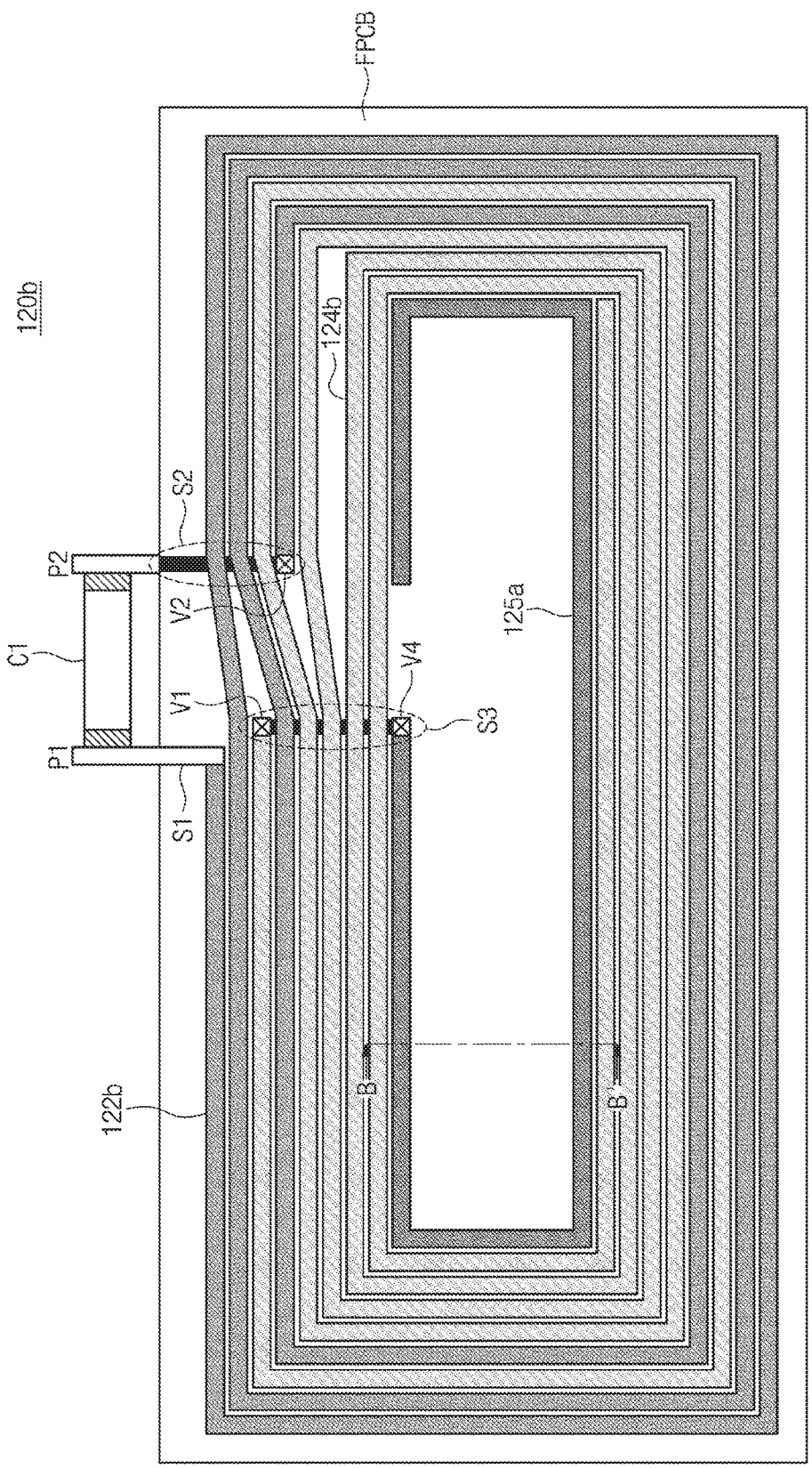
FIG. 5 is a floor plan illustrating an upper surface of a double resonance loop antenna according to a second exemplary embodiment.

FIG. 5 is a floor plan illustrating an upper surface of a double resonance loop antenna according to a second exemplary embodiment. Referring to FIG. 5, a double resonance loop antenna 120b may include a first capacitor C1 for composing a source loop between two ports P1 and P2, a source coil pattern 122b formed on an upper surface of a FPCB, a resonance coil pattern 124b, and a capacitor pattern 126b for composing a second capacitor C2 for composing a resonance loop. Here, the capacitor pattern 126b for composing the second capacitor C2 may be formed with an edge coupled capacitor.

The capacitor pattern 126b formed with the edge coupled capacitor may only be formed on the upper surface of the FPCB. A metal conductive line S3 for connecting via V1 and via V4 may be formed on a lower surface of the FPCB. Accordingly, in case where a coil pattern or a capacitor pattern may be formed only on one surface of the FPCB, the double resonance loop antenna 120b according to the second exemplary embodiment may be usefully applied.

The source coil pattern 122b is formed on the upper surface of the double resonance loop antenna 120b, and is formed substantially the same as the source coil pattern 122a described in FIG. 2. That is, a loop for composing the source coil pattern 122b starts from a first port P1, rotates with a plurality of turns with a helical type, and terminates at a via V2 for connecting to a second port P2. A terminal of the source coil pattern 122b is connected to a conductive line S2 formed on the lower surface of the FPCB by the via V2. The conductive line S2 is pulled out to the second port P2. Accordingly, the source coil pattern 122b for composing one source loop is electrically connected to two ports P1 and P2 for providing a signal to the double resonance loop antenna 120b. As a result, a source loop is composed through a parallel connection with a chip capacitor C1 provided between two ports P1 and P2. Here, the number of turns of a loop for composing the source coil pattern 122b may be determined according to magnitude of a first inductor L1 supplied as a distribution circuit constant.

The resonance coil pattern 124b and the capacitor pattern 126b are formed on the upper surface of the double resonance loop antenna 120b. The resonance coil pattern 124b may be formed with a helical conductive line to rotate with a plurality of turns for forming a second inductor L2 for composing the resonance loop. The resonance coil pattern 124b starts from the via V1 for connecting a pattern of a lower surface of the double resonance loop antenna 120b. Moreover, the resonance coil pattern 124b is formed with a helical coil having a plurality of turns on the upper surface of the FPCB. A conductive line for forming the source coil pattern 122b may be formed among conductive lines for composing the resonance coil pattern 124b. However, the source coil pattern 122b and the resonance coil pattern 124b may be electrically separated.

The capacitor pattern 126b for composing an edge coupled capacitor is formed in the resonance coil pattern 124b. The resonance coil pattern 124b and the capacitor pattern 126b are not electrically connected on the upper surface of the FPCB. The capacitor pattern 126b is connected to the conductive line S3 formed on the lower surface of the FPCB through the via V4. The capacitor pattern 126b is connected to a start point of the resonance coil pattern 124b through via V1 and via V4 and the conductive line S3 on the lower surface. For this purpose, the via V4 may be formed to penetrate the FPCB, thereby making it possible to connect the conductive line S3 on the lower surface and the capacitor pattern 126b on the upper surface.

The capacitor pattern 126b is provided as the edge coupled capacitor. That is, a second capacitor C2 may be formed by a distributed capacity formed by an interval between the capacitor pattern 126b and the resonance coil pattern 124b. Because the interval between the capacitor pattern 126b and the resonance coil pattern 124b may be narrow, a capacity component may be distributed among two conductive lines. Accordingly, the second capacitor C2 may have magnitude enough to provide a quality factor Q of a resonance coil by maximizing this capacity. Here, any pattern for a resonance loop may not be formed on the lower surface of the capacitor pattern 126b.

While a loop in which conductive lines for composing each of the capacitor pattern 126b and the resonance coil pattern 124b are formed to be adjacent to each other has one turn, the conductive lines for composing each of the capacitor pattern 126b and the resonance coil pattern 124b may be formed to have a plurality of turns for a sufficient capacity of the second capacitor C2. Accordingly, the resonance coil pattern 124b and the capacitor pattern 126b may be formed to have the number of turns and a length of a loop for providing a LC value for an optimal resonant frequency.

Figure 6:
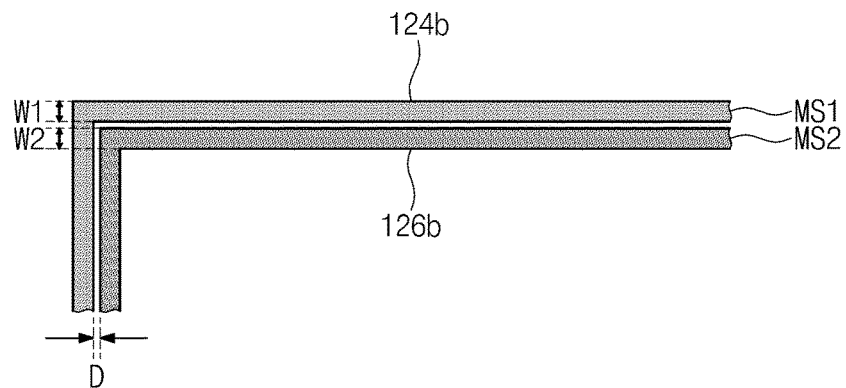
FIG. 6 is a diagram illustrating a structure of a capacitor pattern and a resonance coil pattern shown in FIG. 5.

FIG. 6 is a diagram schematically illustrating a structure of the capacitor pattern 126b and the resonance coil pattern 124b shown in FIG. 5. Referring to FIG. 6, the capacitor pattern 126b and the resonance coil pattern 124b may be formed on the same surface.

A conductive line MS1 for forming the resonance coil pattern 124b may be formed outside a conductive line MS2 for forming the capacitor pattern 126b. The conductive lines MS1 and MS2 may be formed to have a helical type having a plurality of turns in parallel. That is, the conductive line MS2 may be formed in an empty space that is defined by the conductive line MS1 with a helical type. A line width W1 of the conductive line MS1 for forming the resonance coil pattern 124b and a line width W2 of the conductive line MS2 for forming the capacitor pattern 126b may be defined identically or differently.

Likewise, an interval D between the conductive lines MS1 and MS2 may affect a capacitance. Accordingly, the line widths W1 and W2 and the interval D between the conductive lines MS1 and MS2 may be determined according to a value for providing an optimized quality factor Q.

Figure 7:
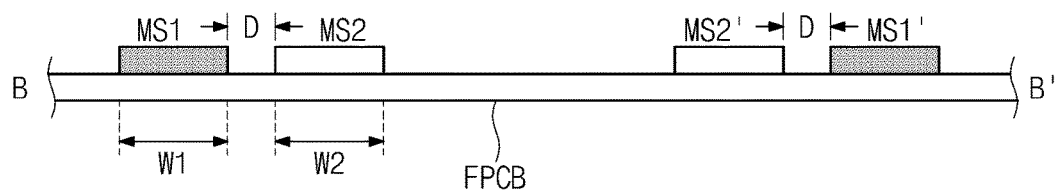
FIG. 7 is a cross-sectional view taken along line B-B' shown in FIG. 5.

FIG. 7 is a cross-sectional view taken along a line B-B' shown in FIG. 5. Referring to FIG. 7, the conductive line MS1 for forming the resonance coil pattern 124b and the conductive line MS2 for forming the capacitor pattern 126b are formed only on one surface. That is, the conductive line MS2 for forming a capacitor pattern 126b may be formed on the same surface as the conductive line MS1 for forming a resonance coil pattern 124b. Each of the conductive lines MS1 and MS2 may be formed in the form of a metal strap.

The capacitor pattern 126b formed on an upper surface of the FPCB may be displayed as the conductive lines MS2 and MS2' composed of the metal strap. The conductive lines MS2 and MS2' may be the same conductive line. The conductive lines MS2 and MS2' may be formed to have a coil type of a plurality of turns to obtain an optimized resonance capacitor capacity.

The conductive lines MS2 and MS2' are spaced apart from the conductive lines MS1 and MS1' as much as an interval D. The conductive lines MS2 and MS2' are formed to have a line width W2, and the conductive lines MS1 and MS1' are formed to have a line width W1. The line widths W1 and W2 may be set as same. However, the line widths W1 and W2 and the interval D may be variously changed.

In accordance with the double resonance loop antenna 120b according to the second exemplary embodiment, the resonance coil pattern 124b and the capacitor pattern 126b may be formed on the same surface. That is, the source coil pattern 122b for composing the double resonance loop antenna 120b, the resonance coil pattern 124b, and the capacitor pattern 126b may be formed on the same surface of the FPCB. Accordingly, the double resonance loop antenna 120b may be usefully applied when a constraint condition where it is difficult to form a pattern of a conductive line on both surfaces of the FPCB exists.

Figure 8:
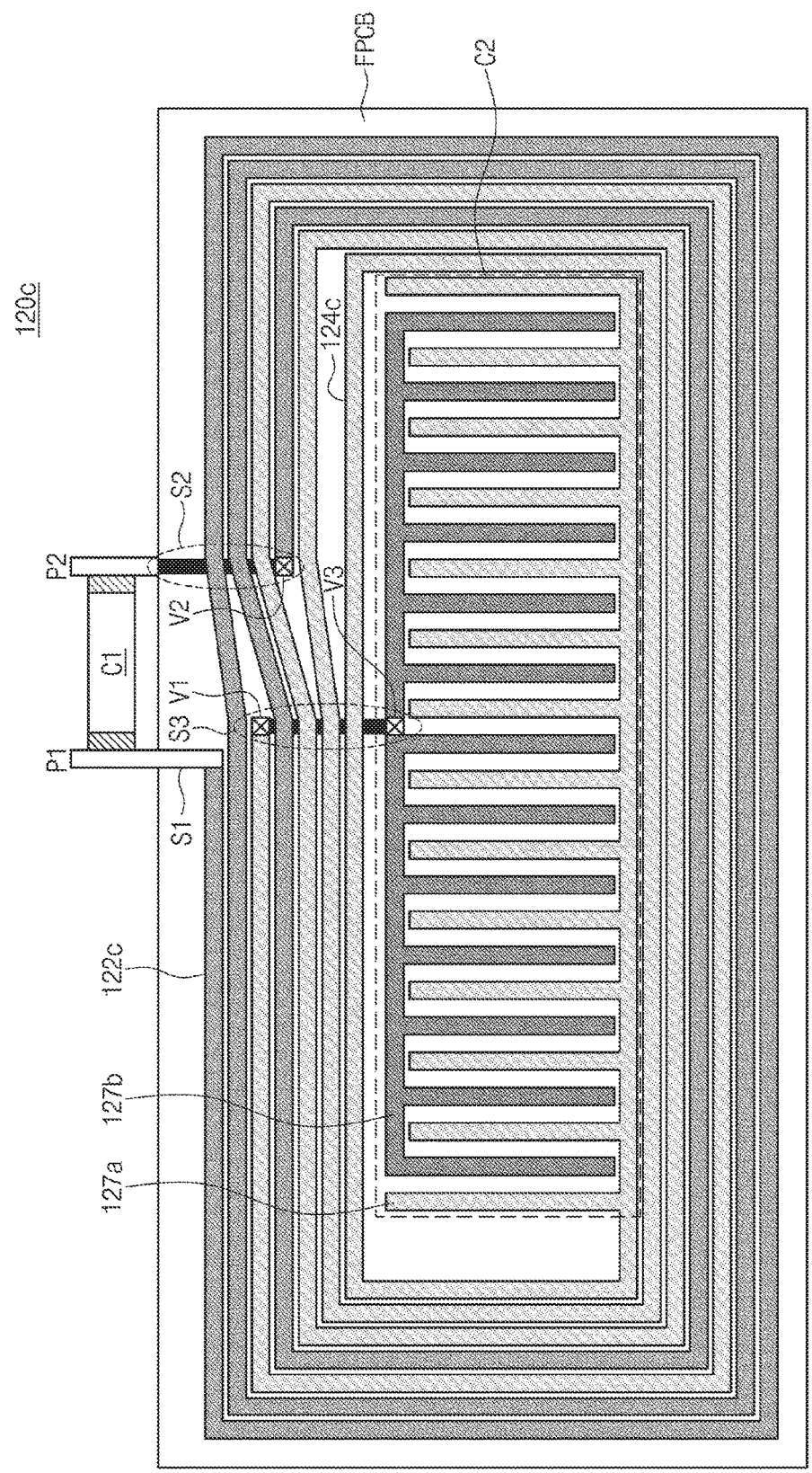
FIG. 8 is a floor plan illustrating a double resonance loop antenna according to a third exemplary embodiment.

FIG. 8 is a floor plan illustrating a double resonance loop antenna according to a third exemplary embodiment. Referring to FIG. 8, a double resonance loop antenna 120c may include a first capacitor C1 for composing a source loop between two ports P1 and P2, a source coil pattern 122c formed on an upper surface of a FPCB, a resonance coil pattern 124c, and a first and second capacitor patterns 127a and 127b for composing a second capacitor C2. Here, the first and second capacitor patterns 127a and 127b for composing the second capacitor C2 are formed with an inter-digital capacitor.

The source coil pattern 122c is formed on an upper surface of the double resonance loop antenna 120c. The source coil pattern 122c may be formed on the upper surface of the FPCB as a conductive line such as a metal. A loop for composing the source coil pattern 122c starts from a first port P1, rotates with a plurality of turns, and terminates at a via V2 for connecting a second port P2. A terminal of the source coil pattern 122c is connected to the second port P2 formed on a lower surface of the FPCB by the via V2. Therefore, the source coil pattern 122c for composing a source loop is electrically connected to the two ports P1 and P2. Furthermore, a source loop is composed through parallel connection with the first capacitor C1 between the two ports P1 and P2. Here, the number of turns of a loop for forming the source coil pattern 122c may be determined according to magnitude of a first inductor L1 supplied as a distribution circuit constant.

The resonance coil pattern 124c and the first and second capacitor patterns 127a and 127b are formed on the upper surface of the double resonance loop antenna 120c. The resonance coil pattern 124c may be formed with a conductive line to rotate with a plurality of turns for forming a second inductor L2 for composing the resonance loop. The resonance coil pattern 124c starts from a via V1 for connecting a pattern of the lower surface of the double resonance loop antenna 120c. Moreover, the resonance coil pattern 124c forms a plurality of helical turns and is formed on the upper surface of the FPCB. A conductive line for forming the source coil pattern 122c may be formed among conductive lines for composing the resonance coil pattern 124c. However, conductive lines for composing the source coil pattern 122c and the resonance coil pattern 124c may be electrically separated.

The first and second capacitor patterns 127a and 127b are formed in the resonance coil pattern 124c (i.e., at one end of the pattern 124c). The first capacitor pattern 127a is connected to one end of the resonance coil pattern 124c and is formed to have a comb-pattern type. The second capacitor pattern 127b is formed to have a comb-pattern type which is formed to be engaged with the comb-pattern type of the first capacitor pattern 127a but not to be electrically connected. The second capacitor pattern 127b is connected to a conductive line S3 on the lower surface through a via V3. Further, the conductive line S3 on the lower surface is connected to a start point of the resonance coil pattern 124c through the via V1.

The first and second capacitor patterns 127a and 127b constitute the second capacitor C2 through a structure of an engaged but electrically disconnected comb-pattern type. That is, a gap between the first capacitor pattern 127a and the second capacitor pattern 127b operates as a dielectric between two conductive lines. Moreover, magnitude of the second capacitor C2 may be easily adjusted through a structure of the first capacitor pattern 127a and the second capacitor pattern 127b. That is, an effective area for forming a capacitor among conductive lines may be changed through the number of a comb-pattern of each of the first capacitor pattern 127a and the second capacitor pattern 127b. Further, the magnitude of the second capacitor C2 may be defined by adjusting an interval between the first capacitor pattern 127a and the second capacitor pattern 127b. Moreover, the magnitude of the second capacitor C2 may be adjusted by adding a material having a relatively high permittivity to a gap between the first capacitor pattern 127a and the second capacitor pattern 127b.

The second capacitor C2 is displayed to occupy most of a center area of the resonance coil pattern 124c, but the inventive concept is not limited thereto. For example, the second capacitor C2 may occupy a part of a center area of the resonance coil pattern 124c and the residual area may be secured as a path of magnetic field.

Figure 9:
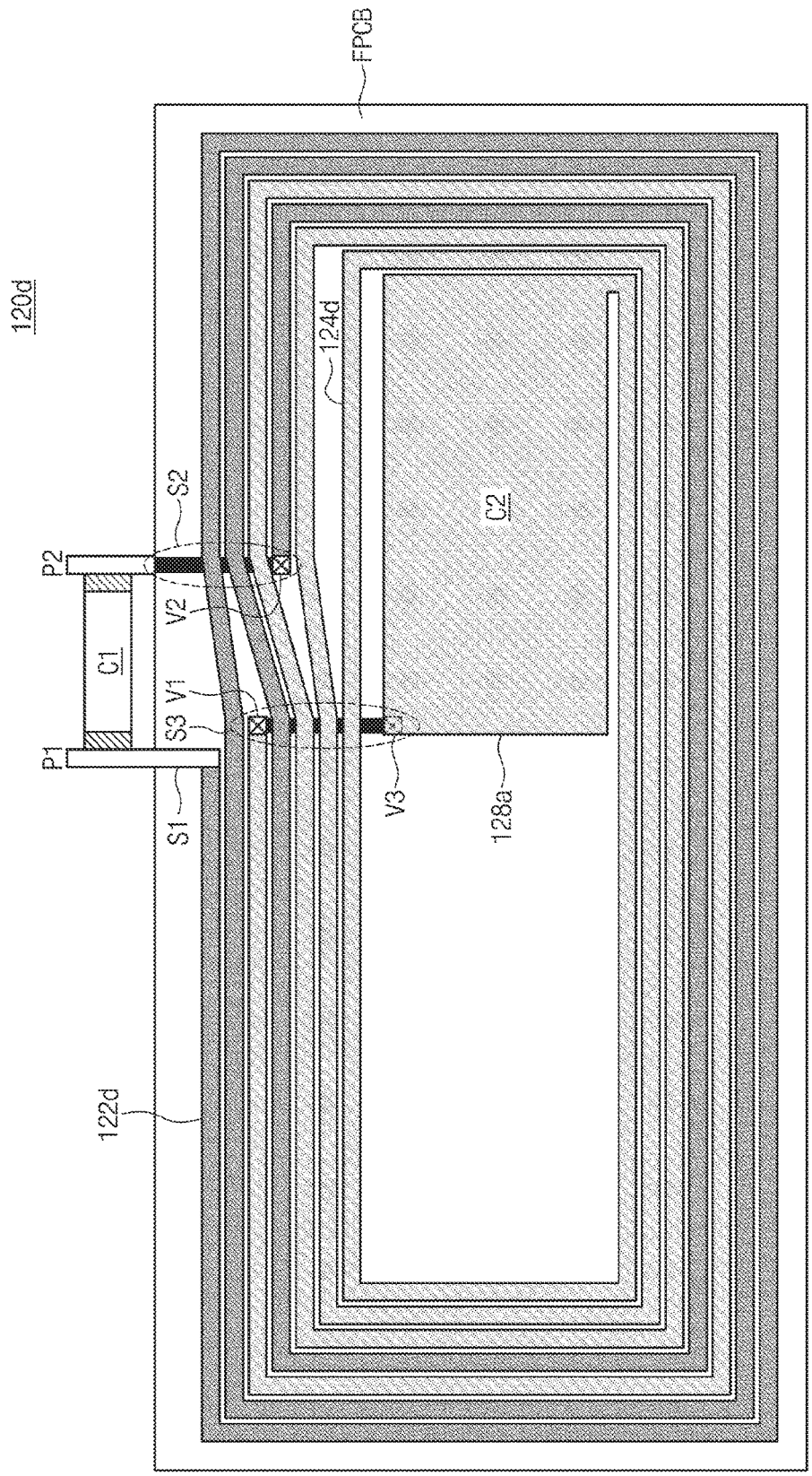
FIG. 9 is a floor plan illustrating a double resonance loop antenna according to a fourth exemplary embodiment.

FIG. 9 is a floor plan illustrating a double resonance loop antenna according to a fourth exemplary embodiment. Referring to FIG. 9, a double resonance loop antenna 120d may include a first capacitor C1 for composing a source loop between two ports P1 and P2, a source coil pattern 122d formed on an upper surface of a FPCB, a resonance coil pattern 124d, and a first capacitor pattern 128a for composing a second capacitor C2.

The source coil pattern 122d is formed on an upper surface of the double resonance loop antenna 120d. The source coil pattern 122d may be formed on the upper surface of the FPCB as a conductive line such as a metal strap. A loop for composing the source coil pattern 122d starts from a first port P1, rotates with a plurality of turns, and terminates at a via V2. One end of the source coil pattern 122d is connected to a second port P2 formed on a lower surface of the FPCB by the via V2. Therefore, the source coil pattern 122d for composing a source loop is electrically connected to the two ports P1 and P2. Furthermore, a source loop is composed through parallel connection with the first capacitor C1 between the two ports P1 and P2. Here, the number of turns of a loop for composing the source coil pattern 122d may be determined according to magnitude of a first inductor L1 supplied as a distribution circuit constant.

The resonance coil pattern 124d and the first capacitor pattern 128a are formed on an upper surface of the double resonance loop antenna 120d. The resonance coil pattern 124d may be formed with a conductive line to rotate with a plurality of turns for forming a second inductor L2 for composing a resonance loop. The resonance coil pattern 124d starts from the via V1 for connecting a pattern of a lower surface of the double resonance loop antenna 120d. Moreover, the resonance coil pattern 124d is formed to have a plurality of helical coil turns on the upper surface of the FPCB. A conductive line for forming the source coil pattern 122d may be formed among conductive lines for composing the resonance coil pattern 124d. However, conductive lines for composing the source coil pattern 122d and the resonance coil pattern 124d may be electrically separated.

The first capacitor pattern 128a is formed at one end of the resonance coil pattern 124d (i.e., in the pattern 124d). The first capacitor pattern 128a is formed with a plain type at one end of the resonance coil pattern 124d. A second capacitor pattern 128b is formed on a lower surface of the FPCB. The second capacitor pattern 128b may be formed with the same type as the first capacitor pattern 128a.

The first and second capacitor patterns 128a and 128b and the FPCB as a dielectric may form the second capacitor C2.

That is, the second capacitor C2 may be formed by a capacity formed by parallel conductive plains. Magnitude of the second capacitor C2 may be easily adjusted by changing areas of the first capacitor pattern 128a and the second capacitor pattern 128b.

Figure 10:
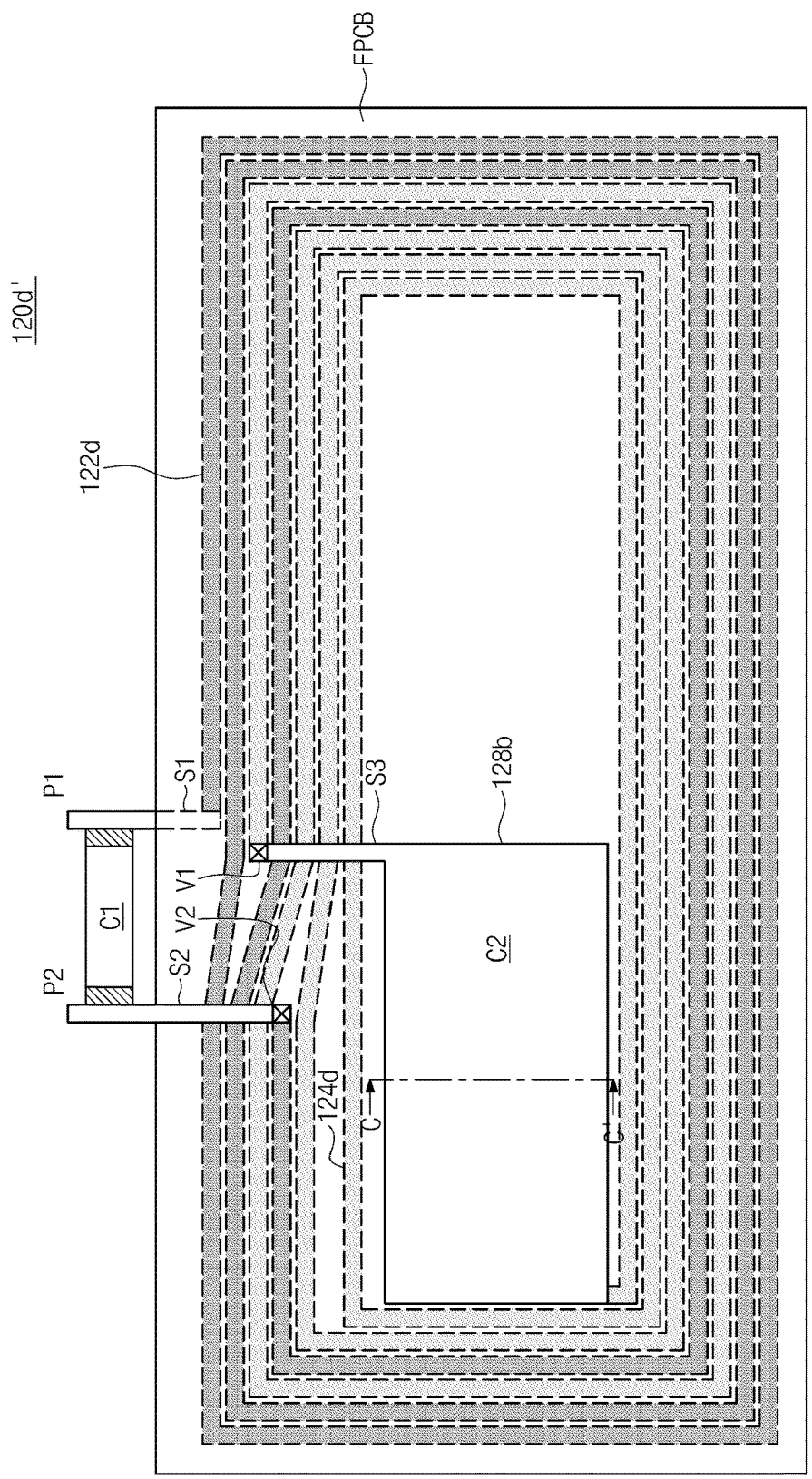
FIG. 10 is a floor plan illustrating a lower surface of a double resonance loop antenna shown in FIG. 9.

FIG. 10 is a floor plan illustrating a lower surface of a double resonance loop antenna shown in FIG. 9. Referring to FIG. 10, a conductive line S2 for pulling out a port P2 to an outside of an antenna, a conductive line S3 connected to a resonance coil pattern 124d on an upper surface through a via V1, and a second capacitor pattern 128b are formed on a lower surface of a double resonance loop antenna 120d'. Here, patterns of a conductive line displayed with a dotted line denote patterns formed on an upper surface.

The conductive line S2 electrically connected to one terminal of the source coil pattern 122d on the upper surface through a via V2 is formed on the lower surface of the double resonance loop antenna 120d'. The conductive line S2 may be connected to a second port P2 included outside the double resonance loop antenna 120d'. A conductive line S1 is formed on the upper surface of the double resonance loop antenna 120d' and is connected to the other terminal of the source coil pattern 122d.

The second capacitor pattern 128b is formed on the lower surface of the double resonance loop antenna 120d'. The second capacitor pattern 128b may be symmetrical with the first capacitor pattern 128a formed on the upper surface with respect to the FPCB. The second capacitor C2 is formed by the second capacitor pattern 128b on the lower surface and the first capacitor pattern 128a on the upper surface. The second capacitor pattern 128b on the lower surface is connected to a conductive line S3. The conductive line S3 is connected to one terminal of the resonance coil pattern 124d on the upper surface through the via V1. That is, the one terminal of the resonance coil pattern 124d formed on the upper surface is electrically connected to the second capacitor pattern 128b of the lower surface through the via V1. Moreover, the other terminal of the resonance coil pattern 124d formed on the upper surface may be electrically connected to the first capacitor pattern 128a formed on the upper surface. Further, the second capacitor C2 may be formed by the FPCB operates as dielectric substance between the first and second capacitor patterns 128a and 128b.

Here, the first and second capacitor patterns 128a and 128b formed on the upper surface and the lower surface have the same form. However, the inventive concept is not limited thereto. For example, shapes of the first and second capacitor patterns 128a and 128b may be variously changed.

Figure 11:
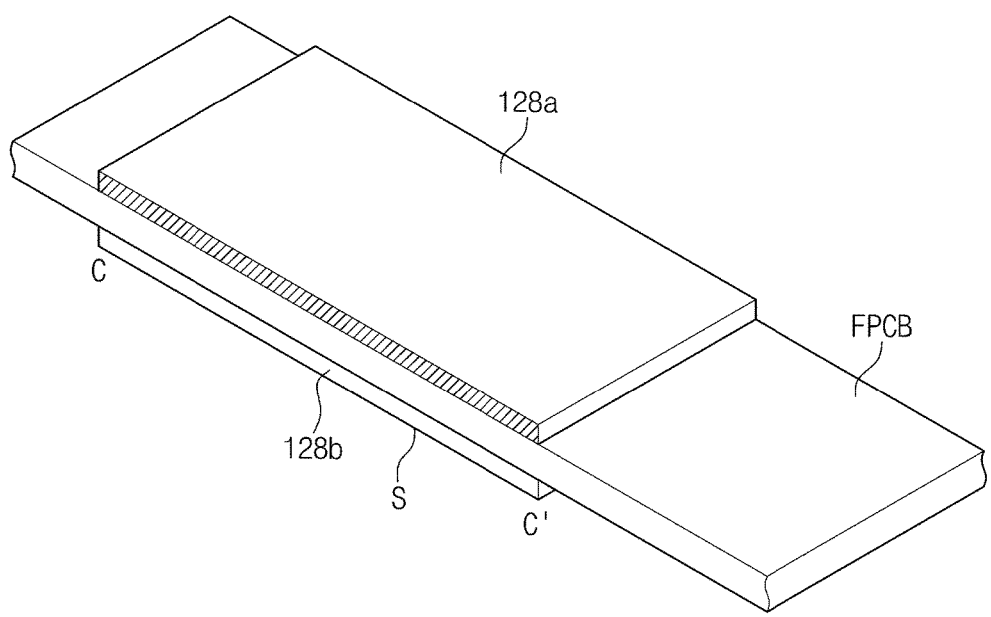
FIG. 11 is a cross-sectional view taken along line C-C' shown in FIG. 10.

FIG. 11 is a cross-sectional view taken along a line C-C' shown in FIG. 10. Referring to FIG. 11, the first and second capacitor patterns 128a and 128b may be formed with the same material as conductive lines of each of an upper surface and a lower surface of a FPCB.

The first capacitor pattern 128a formed on the upper surface of the FPCB may be formed using a metal strap. A conductive plain for forming the first capacitor pattern 128a may be variously changed depending on types for providing a capacity of an optimized resonance capacitor. Moreover, the second capacitor pattern 128b formed on the lower surface of the FPCB is symmetrical with the first capacitor pattern 128a. Further, the FPCB between the first and second capacitor patterns 128a and 128b may operate as a dielectric. Here, an exemplary embodiment is exemplified as the first and second capacitor patterns 128a and 128b are rectangular. However, the inventive concept is not limited thereto. That is, the first and second capacitor patterns 128a and 128b may be formed with a type for raising a coupling coefficient with respect to a bond formed between a source coil and a resonance coil or for raising radiation efficiency of a loop antenna. For example, the first and second capacitor patterns 128a and 128b may be formed with a rectangular or circular conductive plain of which the center is empty.

Figure 12:
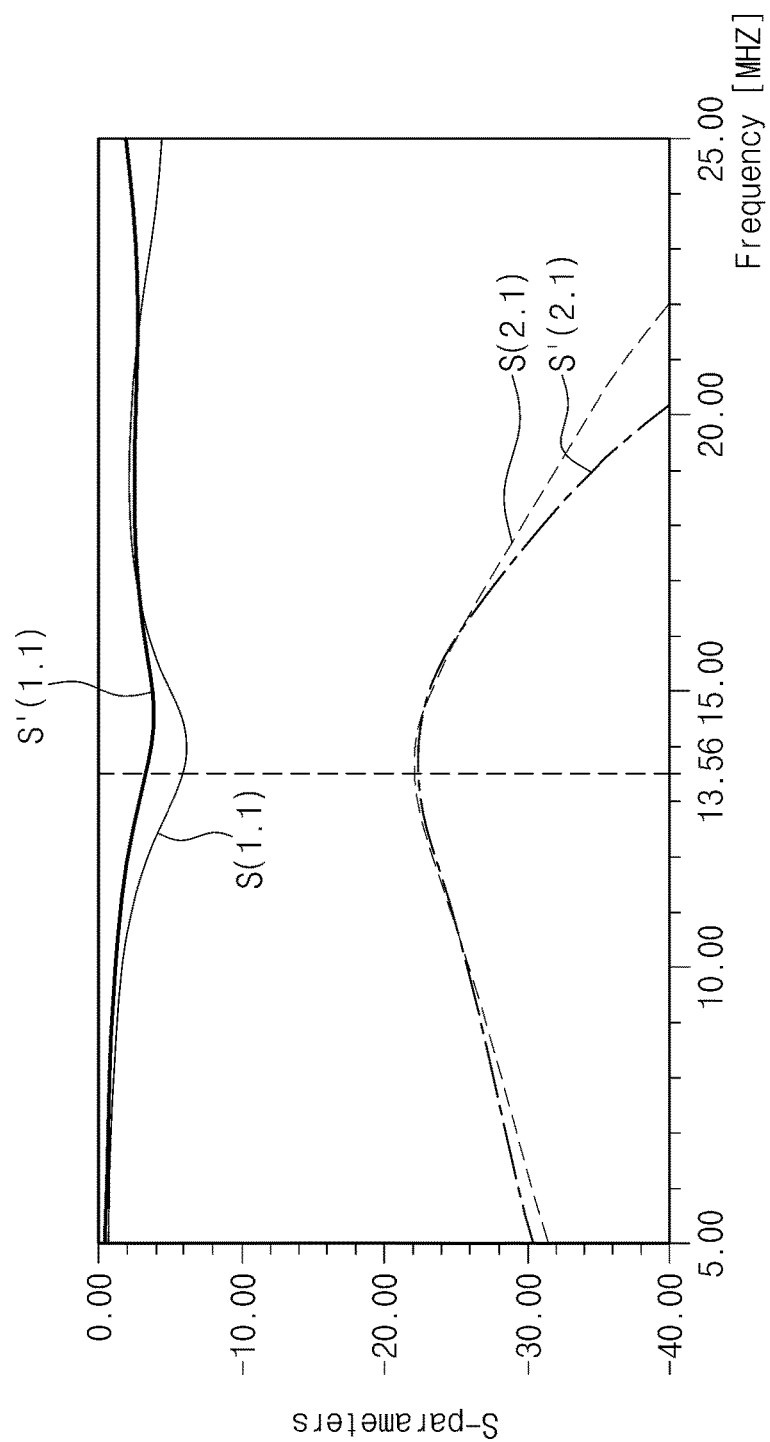
FIG. 12 is a graph illustrating an effect of the inventive concept.

FIG. 12 is a graph illustrating an effect of the inventive concept. FIG. 12 shows S-parameters of an NFC antenna when a resonance capacitor is composed of a pattern of a conductive line according to an exemplary embodiment.

Referring to FIG. 12, S(1, 1) and S(2, 1) denote a reflection characteristic and a penetration characteristic, from among S-parameters measured through two ports included in a double resonance loop antenna according to an exemplary embodiment. Here, S-parameters S'(1, 1) and S'(2, 1) denote characteristics when a resonance capacitor is composed of a chip capacitor. Moreover, S-parameters S(1, 1) and S(2, 1) denote characteristics when a resonance capacitor is composed of a pattern of a conductive line according to an exemplary embodiment.

S(2, 1) of an NFC antenna is equal to S'(2, 1) when a chip capacitor is used as a capacitor of a resonance coil loop in a bandwidth of 13.56 MHz. That is, the double resonance loop antenna according to an exemplary embodiment may provide high antenna transmission efficiency without using two-port configuration and a chip capacitor. Moreover, the double resonance loop antenna according to an exemplary embodiment may provide a high quality factor Q by minimizing use of a via.

Figure 13:
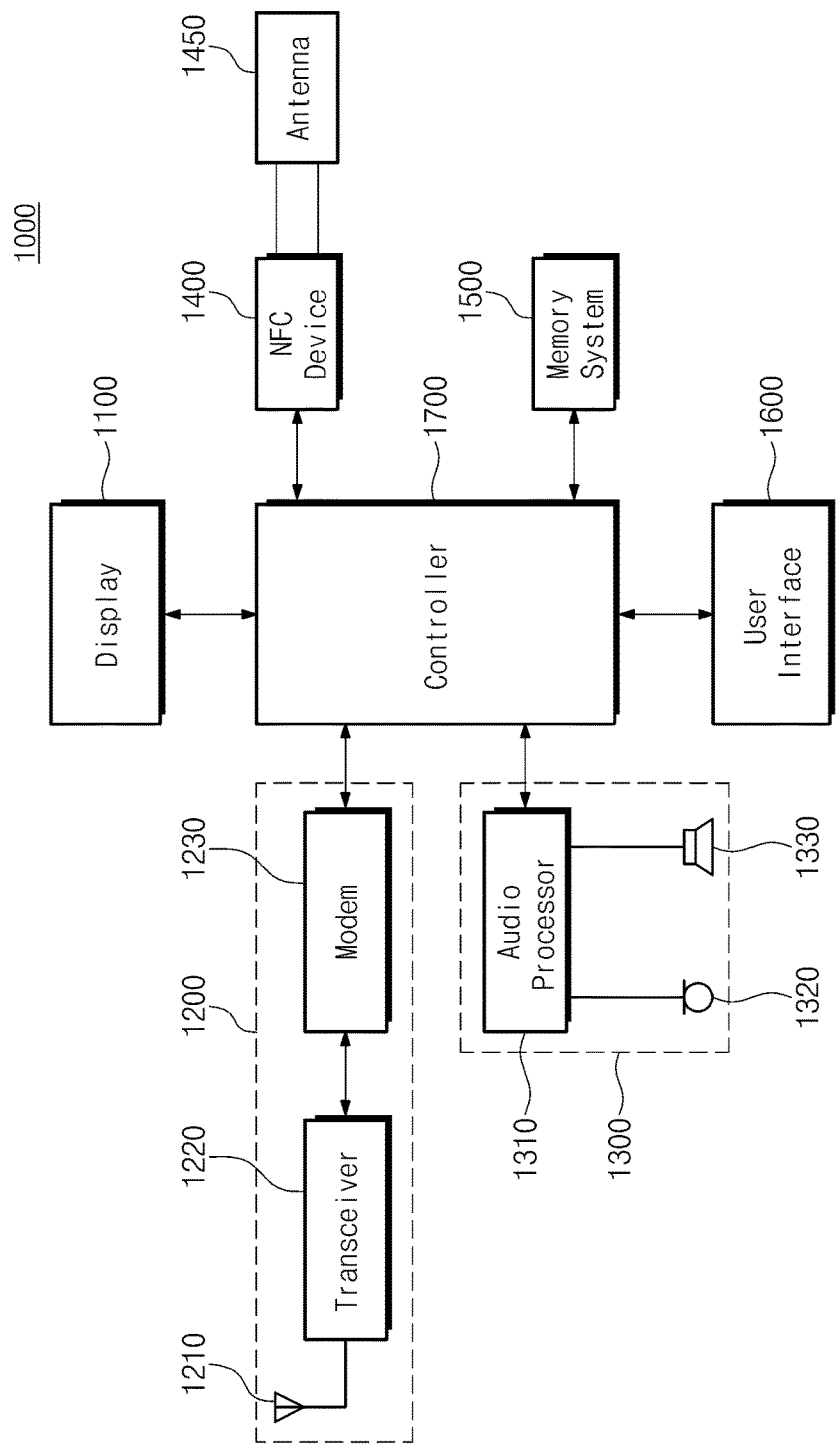
FIG. 13 is a block diagram illustrating a portable station according to an exemplary embodiment.

FIG. 13 is a block diagram illustrating a portable station according to an exemplary embodiment. Referring to FIG. 13, a portable station 1000 according to an exemplary embodiment t may include a display 1100, a wireless transceiver 1200, an audio processor 1300, an NFC device 1400, an NFC antenna 1450, a memory system 1500, a user interface 1600, and a controller 1700.

The display 1100 displays image information in response to a control of the controller 1700. The wireless transceiver 1200 includes an antenna 1210, a transceiver 1220, and a modem 1230. The audio processor 1300 includes an audio processor 1310, a microphone 1320, and a speaker 1330.

The NFC device 1400 has a function for providing mobile finance services such as a credit card, an e-Money, and a transportation card. The NFC device 1400 may include a security function for storing private information needed in mobile financial and a secret key and a function for near field wireless communication.

The NFC device 1400 performs near field wireless communication through the NFC antenna 1450. The NFC antenna 1450 is formed with a double loop coil type including a source coil and a resonance coil and is connected to the NFC device 1400 through two ports. Moreover, a resonance capacitor of the NFC antenna 1450 may be formed in the NFC antenna 1450 with the same type as a coil pattern of the NFC antenna 1450. That is, a resonance loop may be composed without a connection with a chip capacitor, and a high quality factor Q may be provided. Accordingly, area or port configuration for forming the NFC antenna 1450 may be minimized.

The memory system 1500 may include a working memory and a storage memory. A mobile dynamic random access memory (DRAM) may be used as the working memory. A nonvolatile memory may be used as the storage memory. For example, the nonvolatile memory may be provided with a multi-media card (MMC), an embedded multi-media card (eMMC), a secure digital (SD) card, and a micro secure digital (microSD) card. The controller 1700 may be provided with a system-on-chip (SoC) for operating an application program and an operating system.

While the inventive concept has been described with reference to exemplary embodiments, it will be apparent to those skilled in the art that various changes and modifications may be made without departing from the spirit and scope of the inventive concept. Therefore, it should be understood that the above exemplary embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. An antenna of a near field wireless communication device, the antenna comprising:
    a source coil pattern formed on a first surface of a flexible printed circuit board (FPCB) and formed with a first conductive line between a first antenna port and a second antenna port;
    a resonance coil pattern formed with a second conductive line, which is galvanically separated from the source coil pattern; and
    a capacitor pattern including a first terminal and a second terminal, wherein the first terminal of the capacitor pattern is connected to a first terminal of the second conductive line, and the second terminal of the capacitor pattern is connected to a second terminal of the second conductive line through a third conductive line formed on a second surface of the FPCB,
    wherein the resonance coil pattern is formed with a helical coil having a plurality of turns, and the capacitor pattern rotates along at least a portion of the helical coil of the resonance coil pattern.

2. The antenna of claim 1, wherein the capacitor pattern comprises:
    an upper capacitor pattern formed on the first surface of the FPCB and connected to the second conductive line; and
    a lower capacitor pattern formed on the second surface of the FPCB and electrically connected to the third conductive line.

3. The antenna of claim 2, wherein the upper capacitor pattern and the lower capacitor pattern are symmetrical with respect to the FPCB.

4. The antenna of claim 2, wherein a same type of the lower capacitor pattern is formed on the second surface of the FPCB below a lower surface of the upper capacitor pattern, and a conductive line is not provided on the second surface of the FPCB at a position below a lower surface of the resonance coil pattern.

5. The antenna of claim 2, wherein the capacitor pattern is formed with a metal-insulator-metal (MIM) capacitor.

6. The antenna of claim 2, wherein the upper capacitor pattern and the lower capacitor pattern are formed on the first surface and the second surface of the FPCB to have a plain type.

7. The antenna of claim 1, wherein the source coil pattern rotates a plurality of helical turns.

8. The antenna of claim 7, wherein at least a portion of the first conductive line rotates between the plurality of turns of the resonance coil pattern.

9. The antenna of claim 1, wherein the capacitor pattern comprises:
    a first capacitor pattern formed on the first surface of the FPCB and connected to the second conductive line; and a second capacitor pattern formed on the second surface of the FPCB and electrically connected to the third conductive line through a via.

10. The antenna of claim 9, wherein the first capacitor pattern is a pattern formed by an extended portion of the second conductive line.

11. The antenna of claim 9, wherein the capacitor pattern is formed with an edge coupled capacitor.

12. The antenna of claim 9, wherein the first capacitor pattern and the second capacitor pattern are formed to have an engaged comb-pattern type.

13. The antenna of claim 1, wherein a chip capacitor is connected between the first antenna port and the second antenna port in parallel with the source coil pattern.

14. The antenna of claim 1, wherein the capacitor pattern comprises an upper capacitor pattern and a lower capacitor pattern that are respectively disposed on the first surface and the second surface of the FPCB, and wherein the upper capacitor pattern and the lower capacitor pattern respectively include a first portion that extends in a first direction and a second portion that extends in a second direction different from the first direction.

* * * * *